US012758950B2

(12) United States Patent
Kim et al.

(10) Patent No.: US 12,758,950 B2
(45) Date of Patent: Oct. 13, 2026

(54) NIKEL IRON-BASED CATALYST DOPED WITH METAL HAVING ELECTRONEGATIVITY LOWER THAN THAT OF Ni AND Fe, MANUFACTURING METHOD THEREOF, AND ALKALINE WATER ELECTROLYSIS SYSTEM

(71) Applicant: POSTECH RESEARCH AND BUSINESS DEVELOPMENT FOUNDATION, Pohang-si (KR)

(72) Inventors: Yongtae Kim, Pohang-si (KR); Byungjo Lee, Pohang-si (KR); Sangmun Jung, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 580 days.

(21) Appl. No.: 18/266,678

(22) PCT Filed: Apr. 19, 2023

(86) PCT No.: PCT/KR2023/005298
§ 371 (c)(1),
(2) Date: Jun. 12, 2023

(87) PCT Pub. No.: WO2024/143718
PCT Pub. Date: Jul. 4, 2024

(65) Prior Publication Data
US 2025/0083134 A1 Mar. 13, 2025

(30) Foreign Application Priority Data
Dec. 29, 2022 (KR) ........................ 10-2022-0188309
Apr. 19, 2023 (KR) ........................ 10-2023-0051274

(51) Int. Cl.
*B01J 23/76* (2006.01)
*B01J 37/08* (2006.01)
(Continued)

(52) U.S. Cl.
CPC ............... *B01J 23/76* (2013.01); *B01J 37/08* (2013.01); *B01J 37/16* (2013.01); *C25B 1/04* (2013.01); *C25B 11/061* (2021.01); *C25B 11/089* (2021.01)

(58) Field of Classification Search
CPC .. B01J 37/08; B01J 23/76; B01J 37/16; C25B 11/061; C25B 1/04; C25B 11/089;
(Continued)

(56) References Cited

U.S. PATENT DOCUMENTS

2023/0395816 A1* 12/2023 Kendrick ................. C25B 9/23

* cited by examiner

*Primary Examiner* — Cam N. Nguyen
(74) *Attorney, Agent, or Firm* — LEX IP MEISTER, PLLC

(57) ABSTRACT

The present invention relates to a Ni—Fe-based catalyst for OER doped with a metal having lower electronegativity than Ni and Fe, and a method for manufacturing the same. More specifically, the present invention offers the advantage of using nickel, a non-noble metal-based active catalyst, which has high economic value without the need for noble metals. The present invention provides a method for manufacturing a Ni—Fe-based catalyst for OER that exhibits excellent activity in oxygen generation reaction by maximizing the surface area compared to existing noble metal-based catalysts, thereby contributing significantly to the cost reduction of hydrogen production.

8 Claims, 11 Drawing Sheets

(51) Int. Cl.

| | |
|---|---|
| ***B01J 37/16*** | (2006.01) |
| ***C25B 1/04*** | (2021.01) |
| ***C25B 11/031*** | (2021.01) |
| ***C25B 11/04*** | (2021.01) |
| ***C25B 11/052*** | (2021.01) |
| ***C25B 11/061*** | (2021.01) |
| ***C25B 11/089*** | (2021.01) |
| ***C25B 11/091*** | (2021.01) |

(58) Field of Classification Search

CPC ..... C25B 11/031; C25B 11/04; C25B 11/052; C25B 11/091; Y02E 60/36

USPC .......................................................... 502/337

See application file for complete search history.

Fig. 9A
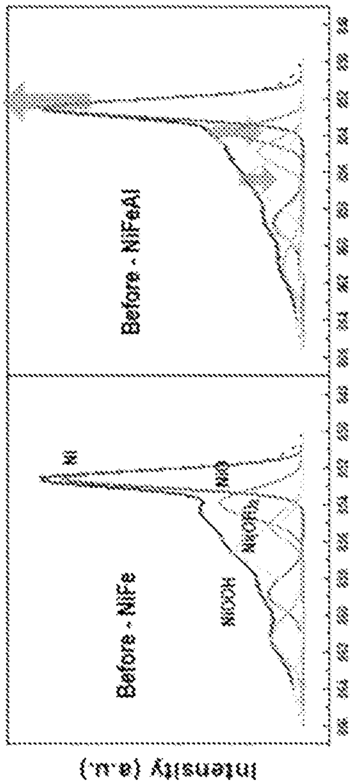
Fig. 9B
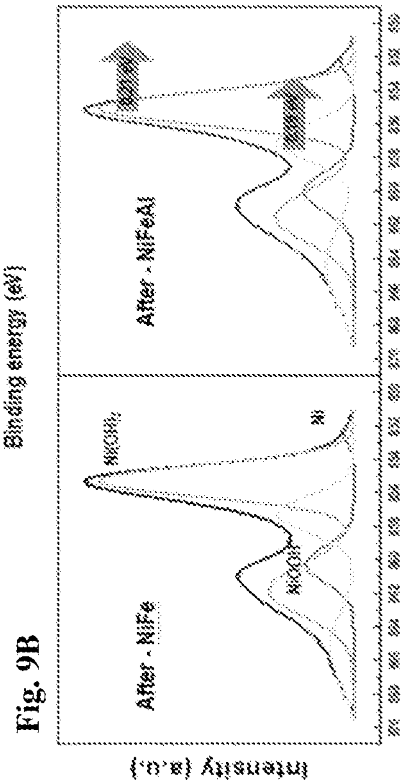
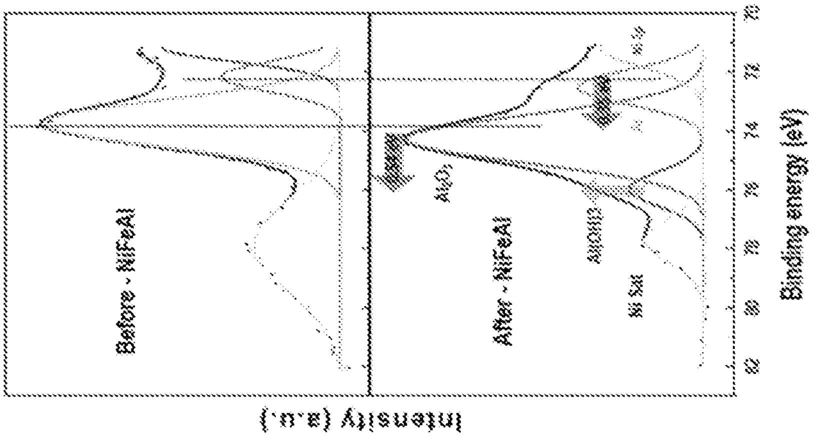
Fig. 9C
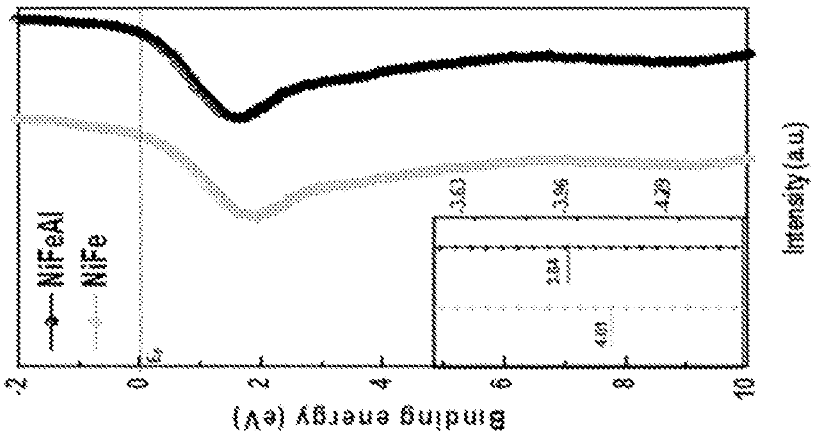
Fig. 9D

NIKEL IRON-BASED CATALYST DOPED WITH METAL HAVING ELECTRONEGATIVITY LOWER THAN THAT OF Ni AND Fe, MANUFACTURING METHOD THEREOF, AND ALKALINE WATER ELECTROLYSIS SYSTEM

TECHNICAL FIELD

The present invention relates to a nickel-iron-based catalyst and its manufacturing method, specifically to a nickel-iron-based catalyst and its manufacturing method for an Oxygen Evolution Reaction (OER) in which the catalyst, capable of significantly enhancing its activity and durability, is achieved by doping with a metal having a lower electronegativity than Ni and Fe.

BACKGROUND ART

Recently, research has been actively conducted on sustainable and environmentally-friendly energy sources that can serve as alternatives to conventional fossil fuel-based energy sources. While various alternative energy sources such as solar, wind, and tidal energy have been proposed, they present challenges due to their limited conditions for energy extraction and the inability to directly store the energy they generate. In contrast, hydrogen energy can be easily obtained through the electrolysis of water irrespective of external conditions, and it allows for the storage of energy in the form of hydrogen. Therefore, it has been receiving significant attention as a potential substitute for fossil fuels.

To harness hydrogen energy, it is crucial to develop energy storage and conversion technologies, specifically, advancements in water electrolysis technology are necessary. Alkaline water electrolysis catalysts can be categorized into Hydrogen Evolution Reaction (HER) catalysts and Oxygen Evolution Reaction (OER) catalysts. The Oxygen Evolution Reaction ($4OH^- \Rightarrow O_2+2H_2O+4e$), unlike the Hydrogen Evolution Reaction ($2H_2O+2e \Rightarrow H_2+2OH^-$), is a four-electron reaction, making it slower and less efficient. This has posed a significant challenge to the commercialization of water electrolysis.

Particularly, the majority of oxygen evolution reaction catalysts previously studied have been manufactured based on noble metals, leading to significant cost barriers for commercialization due to their high prices. Especially, catalysts developed based on iridium (Ir) pose an urgent challenge due to the recent surge in Ir prices, necessitating immediate research efforts to address this issue. Meanwhile, existing non-noble metal catalysts for OER display significantly lower activity and durability. The currently representative alkaline non-noble metal multiatomic catalysts are nickel-iron (Ni—Fe) based, but their level of activity is considerably far from what is required for commercialization. Hence, there is a pressing need for improvements.

PRIOR ARTS

Prior Patent 1: Korean Patent Publication No. 10-2020-0028275.

Prior Patent 2: Korean Patent Registration No. 10-1396374.

DETAILED DESCRIPTION OF THE INVENTION

Technical Problem

To address the aforementioned problems, the objective of the present invention is to provide a Ni—Fe-based catalyst for OER, which is an active non-noble metal-based catalyst, that is doped with aluminum.

Additionally, another objective of the present invention is to provide a Ni—Fe-based catalyst that exhibits superior activity and durability compared to conventional Ni—Fe-based catalysts.

Furthermore, another objective of the present invention is to provide a Ni—Fe-based catalyst that, by not utilizing noble metals, has economic value and superior activity compared to noble metal-based catalysts and, this will significantly contribute to reducing the cost of hydrogen production.

The aforementioned and other objectives of this invention can all be achieved through the implementation of the invention as described below.

Technical Solution

To achieve the aforementioned objectives, a doped Ni—Fe-based catalyst for OER according to an Example of the present invention may comprise: an alloy comprising Fe; Ni; and a metal having electronegativity lower than that of Ni and Fe, wherein the alloy may comprise Ni and Fe at a molar ratio of 9:1 to 3:2.

In this case, the metal having electronegativity lower than that of Ni and Fe may comprise Al, Cd, or Zn.

In addition, the alloy may comprise Ni and Fe at a molar ratio of 3:1.

In addition, the alloy may comprise a metal having electronegativity lower than that of Ni and Fe at a molar ratio of 5% to 10%.

In addition, the alloy may most preferably comprise a metal having electronegativity lower than that of Ni and Fe at a molar ratio of 5%.

In addition, the metal having electronegativity lower than that of Ni and Fe may comprise Al.

Detailed aspects of other embodiments are included in the thorough description and the accompanying drawings.

Advantageous Effects

Therefore, according to the present invention, by doping aluminum into Ni—Fe, a non-noble metal-based active catalyst, we can provide a Ni—Fe-based catalyst for OER that exhibits superior activity and durability compared to traditional Ni—Fe-based catalysts.

Furthermore, the Ni—Fe-based catalyst for OER according to the present invention has economic value due to its avoidance of noble metals. Given its superior activity compared to noble metal-based catalysts, it can significantly contribute to reducing the cost of hydrogen production.

However, the effects achieved by the present invention are not confined to the examples given above, and the present specification includes a variety of other potential benefits.

DESCRIPTION OF THE DRAWINGS

FIGS. 9A to 9D is an XPS (X-ray Photoelectron Spectroscopy)-based graph aimed at explaining the effect of aluminum doping in a NiFe electrode in accordance with an example of the present invention.

BEST MODE

Figure 1:
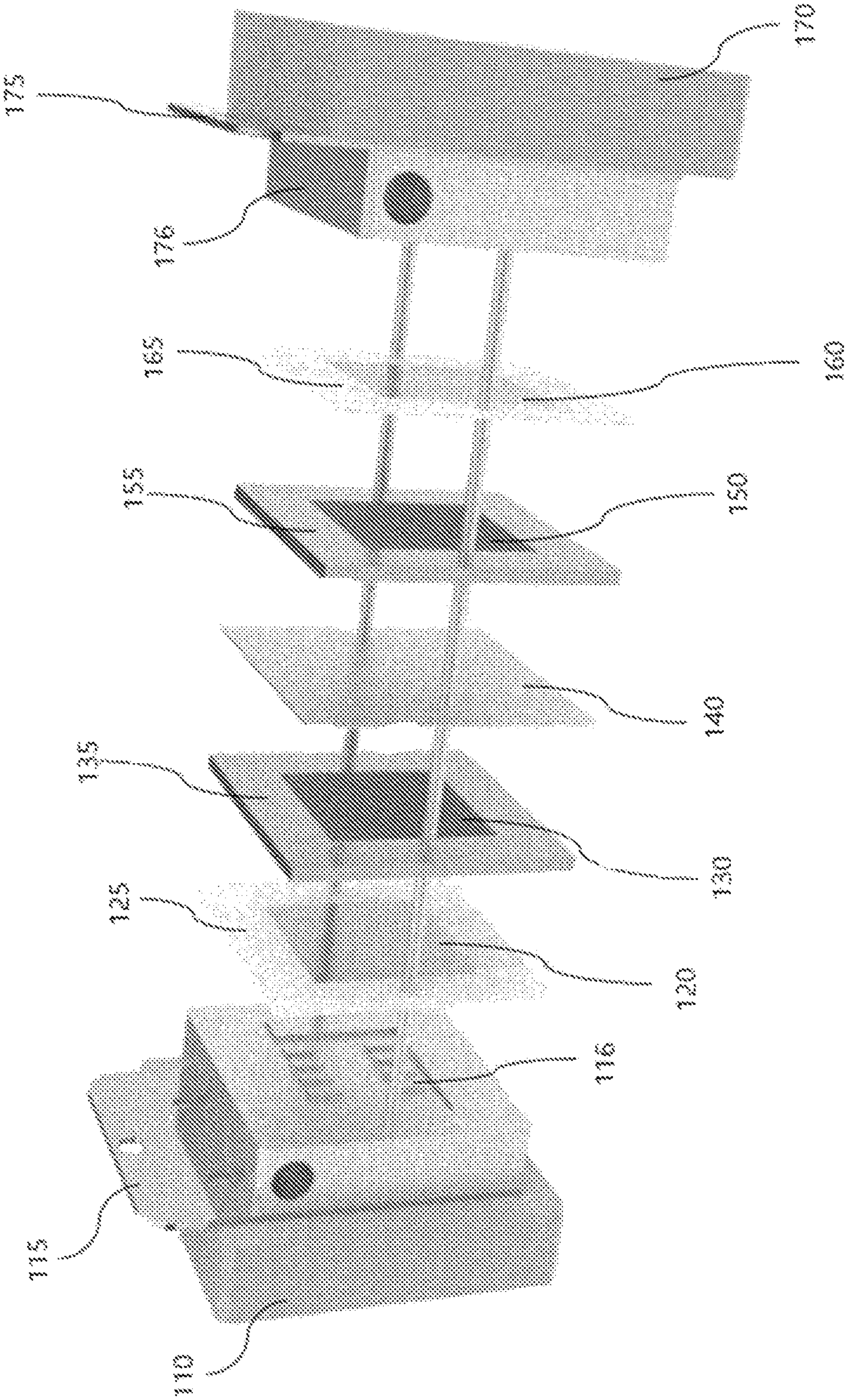
FIG. 1 is a schematic diagram of an alkaline water electrolysis cell according to an embodiment of the present invention.

Hereinafter, the embodiments of the present application will be explained in greater detail with reference to the accompanying drawings. However, the technology disclosed in this application is not confined to the embodiments discussed herein and can be materialized in other forms. The embodiments introduced here are provided to ensure that the disclosed content is comprehensive and complete, and to sufficiently convey the concept of this application to those skilled in the art. In the drawings, the width or thickness of components, among other dimensions, has been somewhat magnified to clearly depict the components of each device.

Furthermore, for the sake of convenience in description, only some components have been depicted, however, those skilled in the art should be able to readily understand the remaining components. Generally, when explaining the drawings, it was done so from the observer's perspective, and when it is mentioned that one element is located above or below another, it includes all meanings that the particular element could be directly above or below the other, or there could be additional elements interspersed between them.

Furthermore, someone with ordinary skill in the art would be able to implement the concept of the present application in various other forms within the scope of the technical principle of the present application. Additionally, the same reference numerals in multiple drawings generally indicate the same or similar elements.

Moreover, unless the context clearly dictates otherwise, singular expressions should be understood to include plural expressions. Terms such as 'comprise' and 'have' should be understood to specify the presence of features, numbers, steps, operations, components, parts, or combinations thereof, without excluding the possibility of the presence or addition of one or more other features, numbers, steps, operations, components, parts, or combinations thereof.

Additionally, in the execution of a method or manufacturing method, the individual processes comprising the method may occur in a sequence different from the specified sequence unless a specific order is explicitly stated in the context. Thus, the individual processes may occur in the specified sequence, be performed substantially simultaneously, or be performed in the reverse order.

Moving forward, a more detailed description of the present invention will be provided.

FIG. 1 is a schematic diagram illustrating an alkaline water electrolysis system according to an example of the present invention. As shown in FIG. 1, the alkaline water electrolysis system of the present invention includes end plates (110, 170), current collectors (115, 175), bipolar plates (116, 176), porous transport layers (120, 160), gaskets (125, 165), an anode (130), a separator (140), a cathode (150), and cell frames (135, 165).

End plates (110, 170) ensure that each component can be uniformly compressed and fastened using bolts/nuts during the assembly of the electrolysis system, while also providing protection for the bipolar plates (116, 176) when they are fastened and compressed.

Current collectors (115, 175) are connected to a DC power source to supply the required current (electrons) for electrolysis to the entire system.

Bipolar plates (116, 176) have internal fluid flow channels through which an electrolyte solution (e.g., KOH) is supplied. Oxygen generated through the oxidation reaction at the anode and hydrogen generated through the reduction reaction at the cathode are discharged through these fluid flow channels. Bipolar plates (116, 176) can be made of materials such as nickel.

Porous transport layers (120, 160) perform the function of removing oxygen and hydrogen gas bubbles from the electrode surface under high current density operating conditions. For example, porous transport layers (120, 160) may be made of materials like nickel or nickel foam.

The separator (140) serves as an electrical insulator and acts as a medium for the transport of hydroxide ions during electrolysis, while also physically separating oxygen and hydrogen. The separator material must possess durability in highly alkaline (30% KOH) environments exceeding 80° C. and have low gas permeability to prevent the mixing of hydrogen and oxygen gases generated from both electrodes. Additionally, it requires high ion conductivity. In the past, asbestos, known for its high durability, was commonly used. However, more recently, materials such as porous composites with dispersed ceramic particles and a polymer binder, polyphenylene sulfide (PPS) reinforced with glass fibers, and nickel porous matrices formed by sintering a nickel oxide layer are being utilized.

An anode (130) and cathode (150) are typically composed of transition metals such as Ni, Fe, Co, and Mo. They are coated onto stainless steel porous bodies (perforated plates, meshes, expanded metal meshes, etc.). For instance, Raney Ni is employed as a hydrogen-generating electrode due to its high electrode activity.

In this specific example, Raney Ni was used as the material for the cathode (150). Furthermore, in the Examples of the present invention, the anode (130) employed NiFe alloy doped with a metal of lower electronegativity than Ni and Fe, such as NiFeAl, NiFeCd, or NiFeZn.

Subsequently, a detailed description will be provided for the Ni—Fe-based catalyst for OER included in the cathode (130) of the alkaline water electrolysis system according to an Example of the present invention.

MODE OF THE INVENTION

Ni—Fe-Based Catalyst for OER According to an Example of the Present Invention

A Ni—Fe-based catalyst for OER, which is an Example of the present invention, comprises an alloy that includes Fe, Ni, and a metal with lower electronegativity than Ni and Fe. The alloy may consist of Ni and Fe at a molar ratio ranging from 9:1 to 3:2. In the most preferable case, the molar ratio of Ni and Fe is 3:1. The metal with lower electronegativity than Ni and Fe can be, for example, Al, Zn, or Cd, with Al being the most preferable choice.

Moreover, Ni and a metal with lower electronegativity than Ni and Fe (e.g., Al, Zn, Cd) can be included in the alloy at a molar ratio of 5% to 10%. In the optimal scenario, Ni and a metal with lower electronegativity than Ni and Fe (e.g., Al, Zn, Cd) are included at a molar ratio of 5%.

Thus, the present invention provides an excellent doped Ni—Fe-based catalyst for OER, demonstrating outstanding activity and durability in the oxygen generation reaction. The catalyst contributes significantly to reducing the cost of hydrogen production by utilizing a non-noble metal-based catalyst.

A Method for Manufacturing a Ni—Fe-Based Catalyst for OER According to an Example of the Present Invention.

Figure 2:
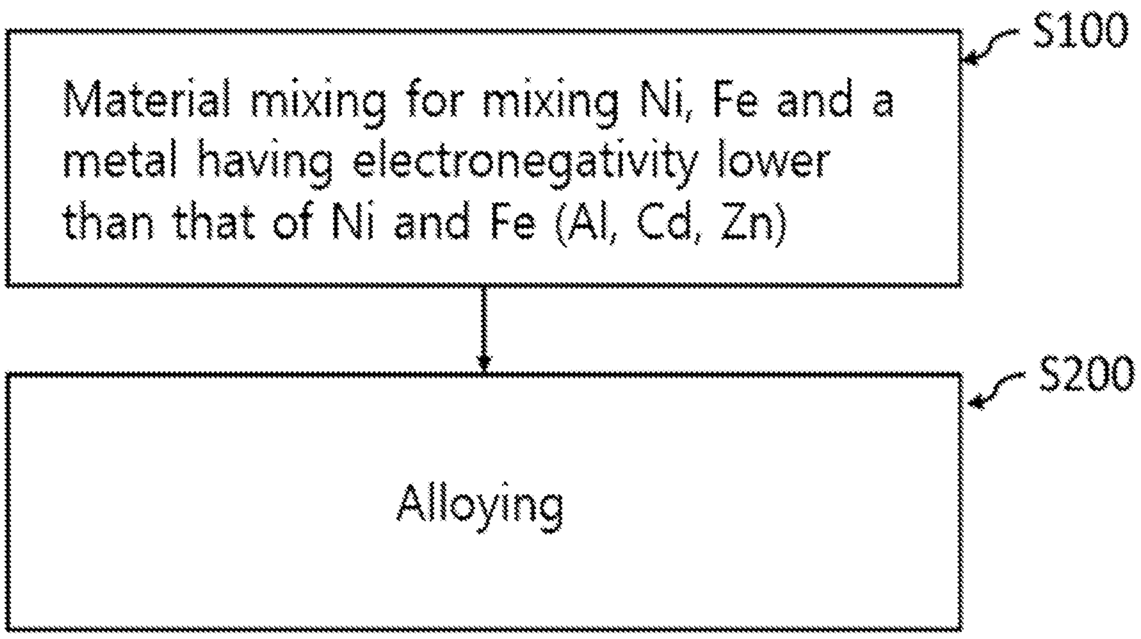
FIG. 2 is a flow chart illustrating a method for manufacturing a Ni—Fe-based catalyst for OER according to an embodiment of the present invention.

According to FIG. 2, another aspect of the present invention is a method for manufacturing a Ni—Fe-based catalyst for OER. The method includes a material mixing step (S100) where powders of Ni, Fe, and a metal with lower electronegativity than Ni and Fe (e.g., Al, Zn, Cd) are mixed to prepare a mixed powder or a step where a precursor of Ni, Fe, and a metal with lower electronegativity than Ni and Fe is dissolved in a solvent, such as ultrapure water (DI water), and the resulting solution is applied onto a Ni support. The method further includes an alloy formation step (S200) where the mixed powder, a Ni support with a precursor of Ni, Fe, and a metal with lower electronegativity than Ni and Fe mounted on it, or a dissolved precursor of Ni, Fe, and a metal with lower electronegativity than Ni and Fe is subjected to heat treatment in a reducing gas atmosphere to form an alloy.

FIG. 2 is a flow chart illustrating a method for manufacturing a Ni—Fe-based catalyst for OER according to an Example of the present invention.

Referring to FIG. 2, the method for manufacturing a Ni—Fe-based catalyst for OER in the present invention includes a material mixing step (S100) and an alloying formation step (S200).

Material Mixing

The material mixing step (S100) is performed to mix Fe, Ni, and Al in a desired composition to form an Al-doped Ni—Fe-based catalyst for OER as intended in the present invention. While Al is used for the convenience of explanation in this Example, it is understood that other metals with lower electronegativity than Ni and Fe, such as Cd and Zn, can be mixed in a similar manner to Al.

Among these, Fe can be, for example, Fe powder or an Fe oxide. Alternatively, in another specific example of the present invention, an Fe precursor selected from the group consisting of iron sulfate ($FeSO_4$, $Fe_2(SO_4)_3$), iron acetate ($Fe(CO_2CH_3)_2$), iron chloride ($FeCl_2$, $FeCl_3$), iron chloride hydrate ($FeCl_3 \cdot nH_2O$), iron nitrate hydrate ($Fe(NO_3)_3 \cdot 9H_2O$), and combinations thereof can be used. However, the type of Fe precursor is not limited as long as it is used to achieve the objectives of the present invention.

Nickel in the alloy acts as a transition metal that serves as a non-noble metal-based active catalyst for achieving the objectives of the present invention. In this case, nickel can be prepared as a powder. Alternatively, it can be prepared as a precursor. Examples of nickel precursors include NiCl2·xH2O, $(CH_3COO)_2Ni \cdot xH_2O$, nickel (II) carbonate hydroxide, nickel (II) acetylacetonate, nickel (II) hydroxide, $Ni(NO_3)_2 \cdot xH_2O$, $NiSO_4 \cdot XH_2O$, $NiI_2$, and $NiF_2$, or any combination thereof. However, the type of nickel precursor is not limited as long as it is used to achieve the objectives of the present invention.

In this case, a desirable molar ratio for combining Ni and Fe is preferably 9:1 to 3:2, and most preferably 3:1.

Meanwhile, aluminum (Al) can be prepared as a powder or as a precursor. Examples of Al precursors include aluminum sulfate ($Al_2(SO_4)_3$), aluminum chloride ($AlCl_3$), aluminum nitrate ($Al(NO_3)_3$), aluminum nitrate hydrate ($Al(NO_3)_3 \cdot nH_2O$), or any combination thereof. However, the type of Al precursor is not limited as long as it is used to achieve the objectives of the present invention.

In this case, it is desirable for Al to be included in the alloy comprising Fe, Al, and Ni at a molar ratio of 2% to 10%. Most preferably, Al is included at a molar ratio of 5%.

The solvent used can be a polar solvent, such as water or an alcohol-based solvent. The alcohol-based solvent may include, for example, methanol, ethanol, propanol, butanol, pentanol, or a combination thereof. Water may preferably be ultrapure water (DI Water). However, the type of solvent is not limited as long as it is used to achieve the objectives of the present invention.

Alloying

Alloying (S200) is performed with the purpose of forming an alloy by subjecting a mixture of Fe, Al, and Ni powders, a precursor of Ni, Fe, and Al dissolved in a solvent, or a Ni support with a dissolved precursor of Fe and Alto thermal treatment in a reducing gas atmosphere. The reducing gas can include gases such as hydrogen and argon, with a preferred composition of 5% hydrogen and 95% argon. It should be noted that while this Example explains the process with Al as the focus for convenience, it is understood that metals with lower electronegativity than Ni and Fe, such as Cd and Zn, can be applied in the same manner as Al.

The thermal treatment can be carried out at temperatures ranging from 1000 to 1500° C. for a duration of 50 to 100 seconds in a reducing gas atmosphere. Preferably, the thermal treatment can be conducted at temperatures ranging from 1200 to 1300° C. for 70 to 80 seconds in a reducing gas atmosphere. If the conditions fall below the mentioned ranges, a composite of Fe, Ni, and Al may not be formed, whereas exceeding the ranges may result in a reduction of the specific surface area of the formed composite due to sintering.

A Ni—Fe-based catalyst for OER, manufactured using the manufacturing method of the present invention, offers high economic value by utilizing nickel as a non-noble metal-based active catalyst instead of noble metal materials. It demonstrates excellent characteristics, particularly in terms of exhibiting outstanding activity in the oxygen generation reaction and contributing significantly to the reduction of hydrogen production costs.

Subsequently, a more detailed explanation of the configuration and operation of the present invention will be provided through preferred Examples. However, it should be noted that these Examples are presented as preferred instances of the present invention and should not be interpreted as limiting the scope of the invention in any way.

Any additional information not described here can be readily inferred by those skilled in the art, and therefore, its explanation is omitted.

Experimental Example

Determination of Optimal Ratios of Ni—Fe-Based Catalysts

According to the desired compositions (varying the ratio of Ni to Fe to 0:10, 2.5:7.5, 5:5, 7.5:2.5, and 10:0), a Fe precursor was dissolved in ultra-pure water (DI water) and mounted on a Ni support. Subsequently, an alloy in the form of a thin film was formed by thermally treating it at 1100° C. for 70 seconds in a 5% hydrogen and 95% argon atmosphere.

Figure 3:
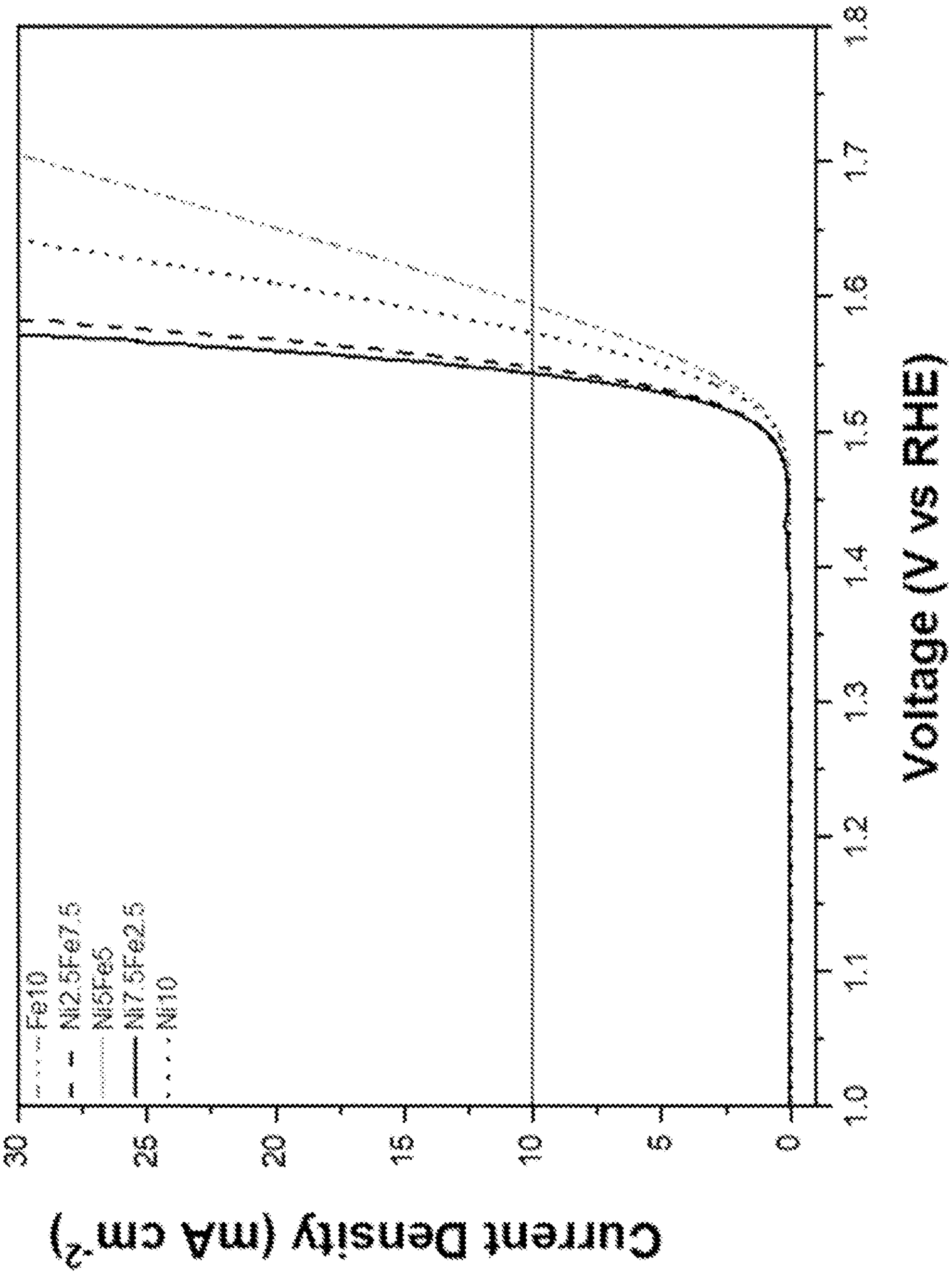
FIG. 3 is a graph displaying the measurements of current density-potential with respect to the oxygen evolution reaction when using a catalyst, while varying the ratio of Ni and Fe.
Figure 4:
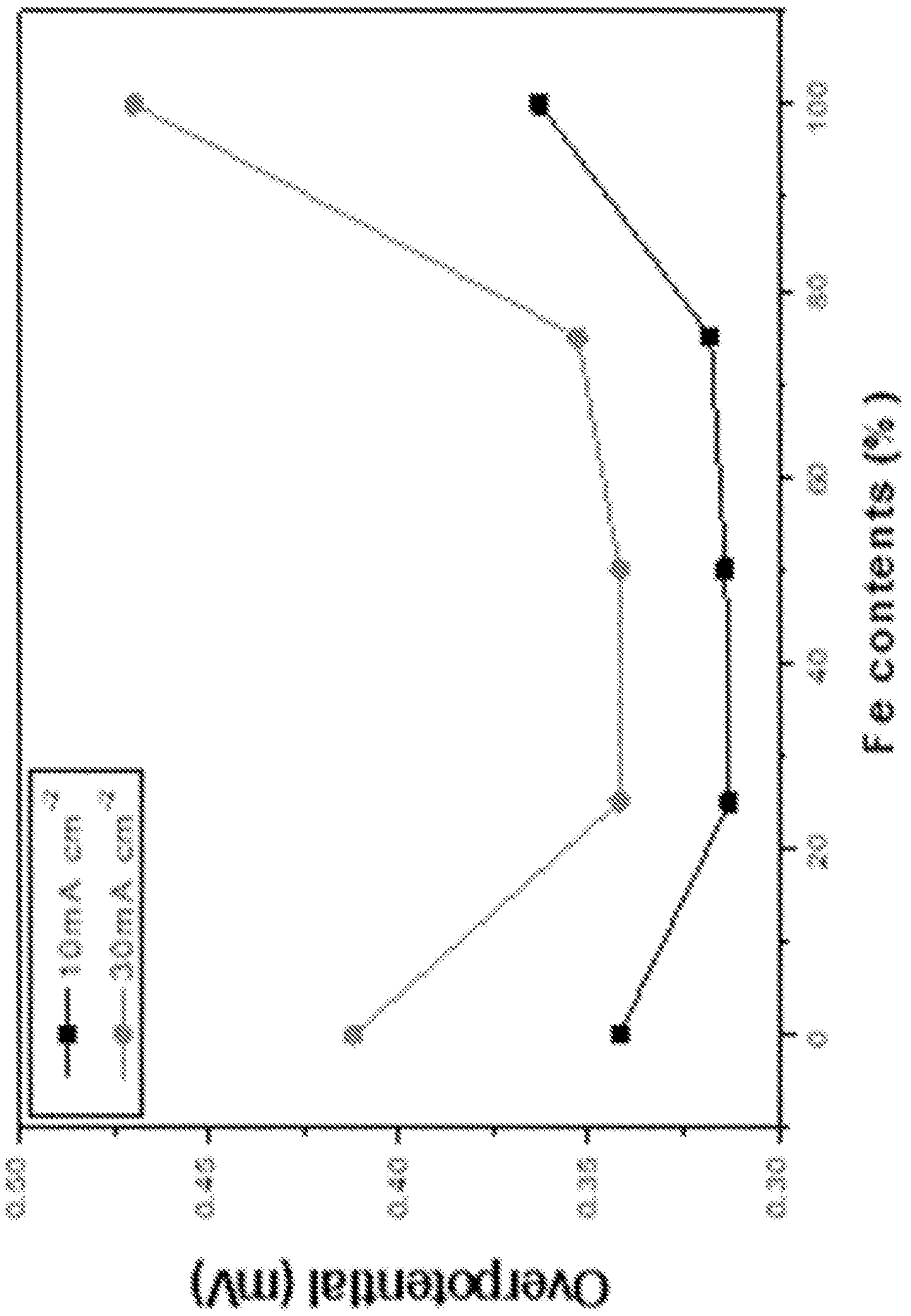
FIG. 4 is a graph measuring the overpotential when the current density reaches 10 mA/cm2, corresponding to the ratio (molar ratio) of Fe from FIG. 3.

FIG. 3 is a graph illustrating the measurements of current density-potential according to the oxygen generation reaction when using Ni and Fe as catalysts with varying ratios of 0:10, 2.5:7.5, 5:5, 7.5:2.5, and 10:0, respectively. FIG. 4 is a graph showing the measurements of overvoltage at a current density of 10 $mA/cm^2$ corresponding to the ratio (molar ratio) of Fe in FIG. 3.

Referring to FIGS. 3 and 4, it can be observed that the maximum efficiency in the oxygen generation reaction is achieved when the Ni:Fe ratio is preferably 9:1 to 3:2. However, the most preferable ratio for maximum efficiency (lowest overvoltage) is Ni:Fe at 3:1. In other words, the potential at which the current density increases sharply is minimized at the ratio of Ni3Fe1. Therefore, the experiment was conducted by fixing the Ni:Fe ratio at 3:1 and doping Al at different ratios.

The catalyst was evaluated using the following method.

A three-electrode experiment was conducted using the catalyst ($Ni_3Fe_1Al_x$) fabricated as the working electrode, along with a reference electrode and a counter electrode. The experiment was set up using a Rotating Disk Electrode (RDE) configuration, and the OER polarization curve was measured under ambient temperature and pressure conditions. Subsequently, the potential at the corresponding current density was measured to compare the overvoltage at 10 $mA/cm^2$.

Conditions for all Experiments a. working electrode: The manufactured catalyst was used as a Rotating Disk Electrode (RDE), which was rotated at 1600 rpm.

Reference electrode: Ag/AgCl

Counter electrode: Pt Wire b. Electrolyte: 1M KOH (pH 14)

c. Temperature: Room temperature (25° C.)

OER activity evaluation experiment a. The electrolyte was purged with argon for 30 minutes to establish an argon atmosphere.

b. The working electrode was rotated at 1600 rpm to remove oxygen generated from the electrode due to OER.

c. Scan rate: 1 mV/s d. Scan range: 0.05 V (vs RHE) to 2.00 V (vs RHE)

Figure 5:
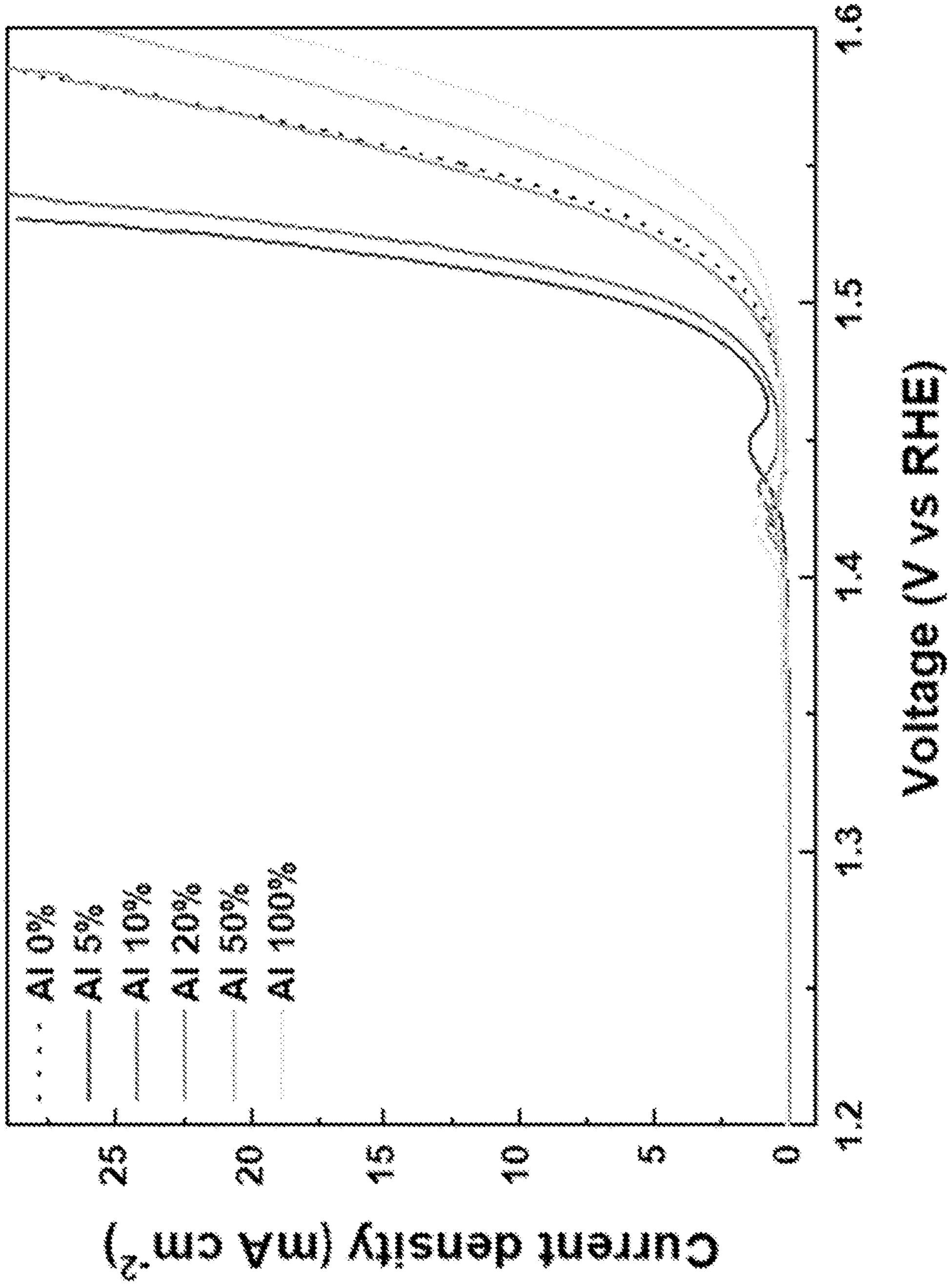
FIG. 5 is a current density-voltage graph representing the activity of the Ni—Fe-based catalyst for OER, according to the aluminum doping ratio in an embodiment of the present invention.
Figure 6:
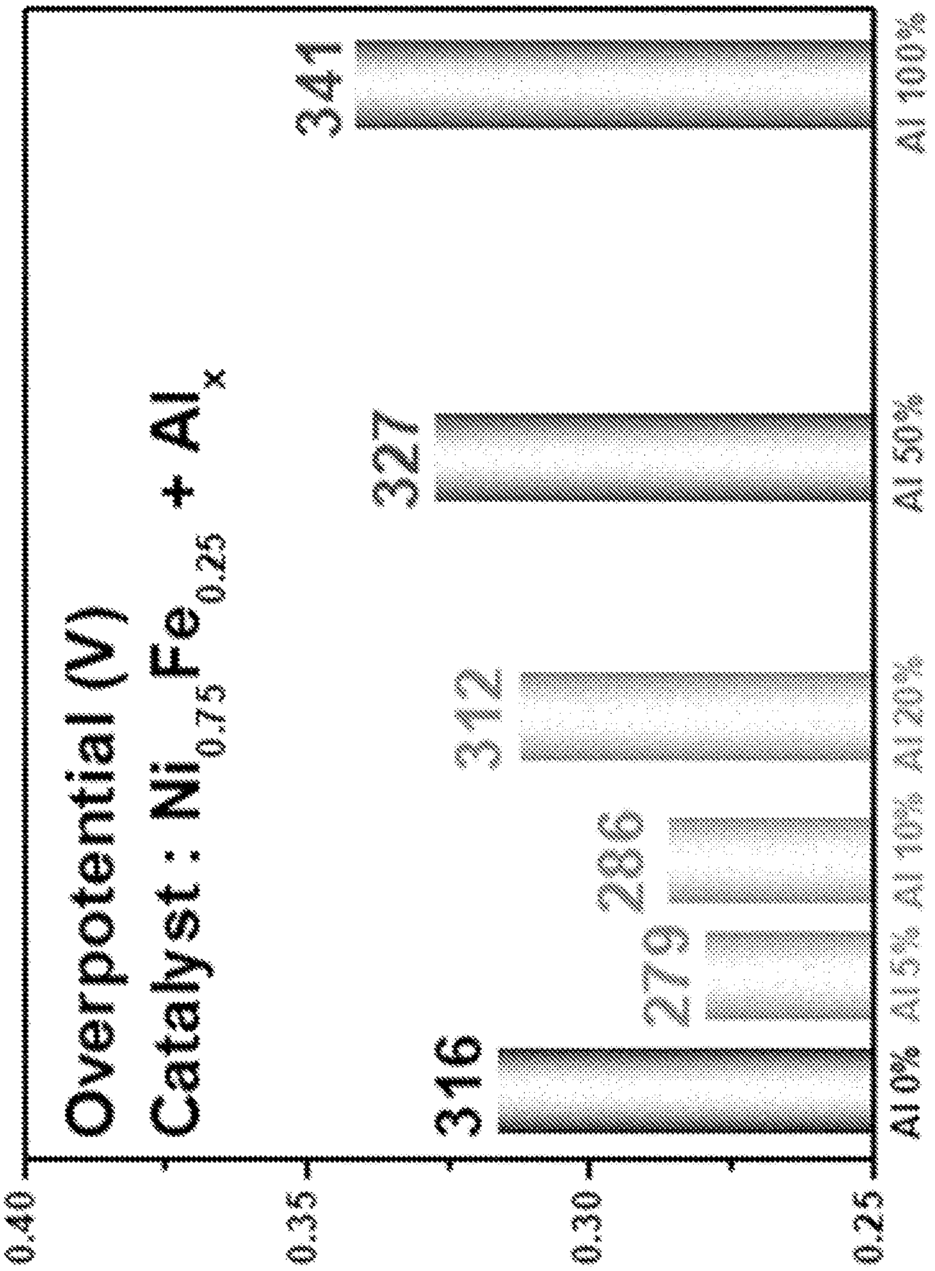
FIG. 6 is a graph illustrating the overpotential of the Ni—Fe-based catalyst for OER, according to the aluminum doping ratio in an embodiment of the present invention.

A catalyst property evaluation experiment was conducted as described above, and the experimental results are shown in FIGS. 5 and 6.

FIG. 5 is a current density-voltage graph illustrating the activity of a $Ni_3$—$Fe_1$-based catalyst for OER based on the aluminum doping ratio according to an Example of the present invention. FIG. 6 is a graph showing the overvoltage of a $Ni_3$—$Fe_1$-based catalyst for OER based on the aluminum doping ratio according to an Example of the present invention.

Referring to FIGS. 5 and 6, it can be observed that when the aluminum doping ratio, which refers to the molar ratio of Al in the overall Fe, Al, and Ni alloy, was within the range of 2% to 10%, the current density increased rapidly at significantly lower voltages compared to the Ni—Fe-based catalyst without aluminum. Moreover, the most favorable activity was achieved when the aluminum doping ratio was 5%. More specifically, it was observed that at an aluminum doping ratio of 5%, the potential at 10 $mA/cm^2$ was approximately 1.509 V, indicating a difference of about 37 mV in overvoltage compared to the Ni—Fe-based catalyst without aluminum doping.

Figure 7:
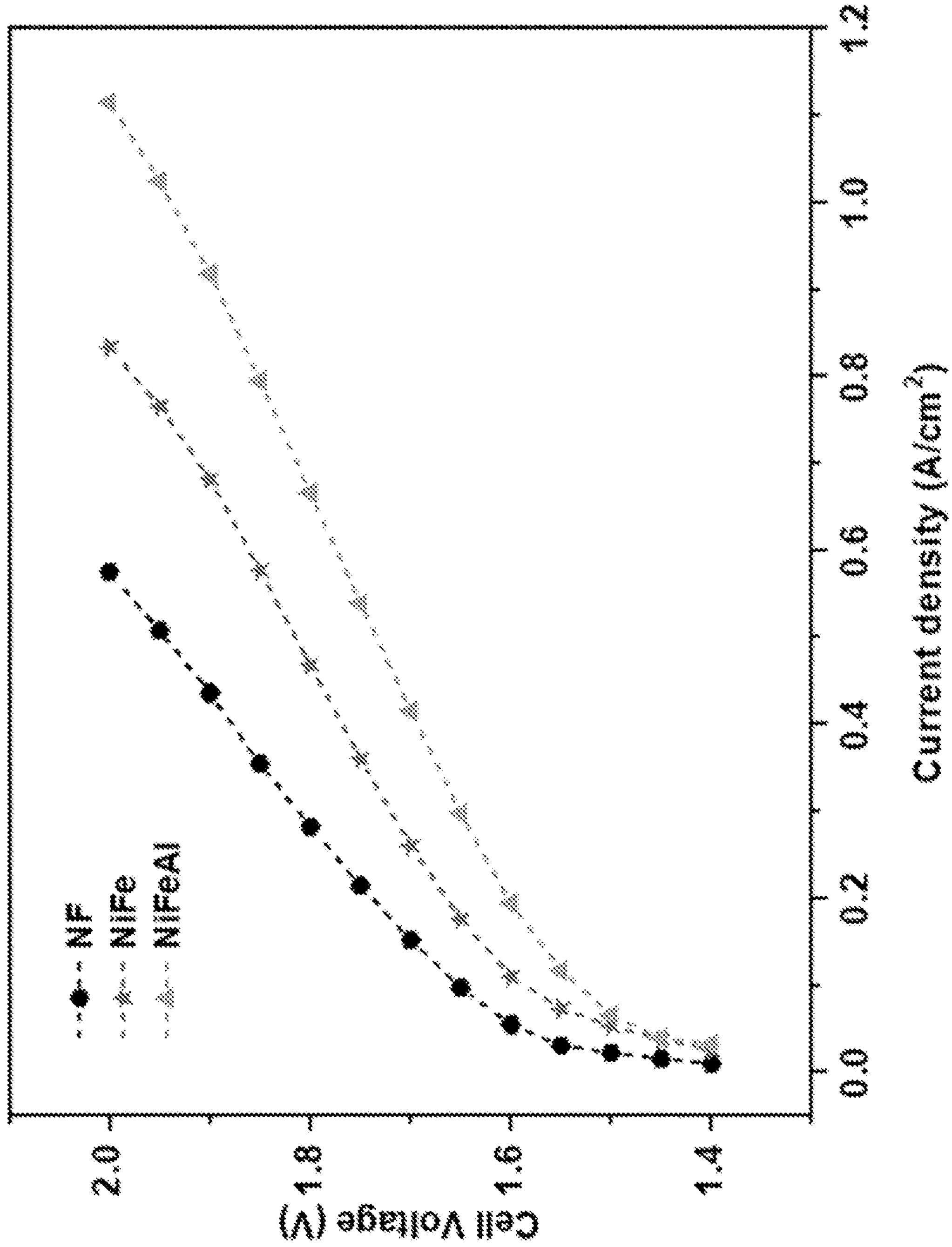
FIG. 7 is a graph demonstrating the performance enhancement of an aluminum-doped Ni—Fe-based catalyst compared to a conventional Ni catalyst, or a Ni—Fe-based catalyst not doped with a metal having lower electronegativity than Ni and Fe.

FIG. 7 is a graph illustrating the performance improvement of an aluminum-doped Ni—Fe-based catalyst compared to a conventional Ni catalyst and an aluminum-undoped Ni—Fe-based catalyst.

Referring to FIG. 7, it can be observed that the aluminum-doped Ni—Fe-based catalyst according to the present invention showed a 236% increase in the oxygen generation reaction compared to the Ni catalyst (nickel foam (NF)) and a 142% increase compared to the aluminum-undoped Ni—Fe-based catalyst (based on 1.8V).

Figure 8:
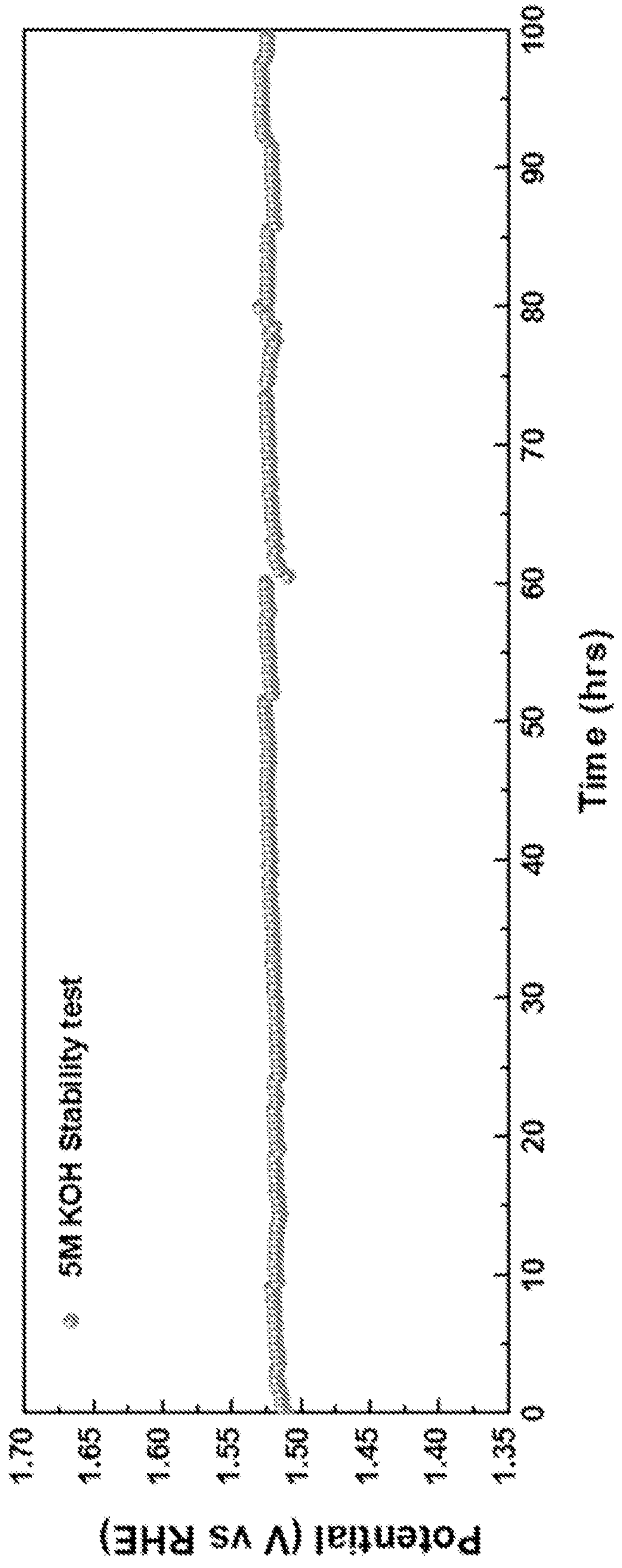
FIG. 8 is a graph evaluating the durability of a Ni—Fe-based catalyst for OER in a 5M KOH electrolyte, according to the aluminum doping ratio in an embodiment of the present invention.

Furthermore, FIG. 8 is a graph showing the durability evaluation conducted in a 5M KOH electrolyte. More specifically, the durability was tested under extreme conditions of 5M KOH used in an actual alkaline water electrolysis cell, rather than 1M KOH. As indicated in FIG. 8, it was confirmed that the aluminum-doped Ni—Fe-based catalyst according to the present invention exhibited excellent durability without performance degradation for over 100 hours even under the extreme conditions of 5M KOH.

FIGS. 9A to 9D is a graph utilizing XPS (X-ray Photoelectron Spectroscopy) to explain the effect of Al doping in a NiFe electrode according to an Example of the present invention. Core level spectra of the NiFe and NiFeAl electrodes were collected at a photon energy of 1150 eV before and after the OER for comparison. FIG. 9A shows the Ni $2p_{3/2}$ spectrum of NiFe and NiFeAl before the OER. It can be observed that the intensity of the NiO peak increased with the addition of Al, indicating charge transfer to Ni due to Al doping. The applicant of the present application clearly confirmed this phenomenon through the Ni $2p_{3/2}$ spectrum of NiFe and NiFeAl after the OER (refer to FIG. 9B). Specifically, in the spectrum of NiFeAl, the peaks attributed to Ni(OH) 2 (855.3-855.1 eV) and NiOOH (857.3-857.1 eV) were shifted in the negative direction compared to NiFe.

Such changes in the electronic structure were also observed in the Al 3p spectrum (FIG. 9C). Referring to FIG. 9C, clear Al 3p peaks were observed after the OER, indicating that Al was preserved and able to participate in the reaction. Peaks around 72.2 and 73.85 eV corresponded to metallic Al $3p_{3/2}$ and $Al_2O_3 3p_{3/2}$, respectively. However, the Al 3p spectrum of NiFeAl after the OER showed that the peaks of Al $3p_{3/2}$ (72.2-72.55 eV) and $Al_2O_3 3p_{3/2}$ (73.85-74.3 eV) shifted in the positive direction, indicating that Al exhibited greater electron depletion. Moreover, negligible changes were observed in the Fe 2p spectrum of NiFe and NiFeAl, indicating that Fe did not participate in the charge transfer. Therefore, the XPS results demonstrated that charge transfer occurs from Al to Ni.

Charge transfer from a dopant can influence the bonding strength of adsorbate species on the catalyst surface, thereby impacting the OER activity. In fact, the intrinsic activity of OER catalysts can be optimized by adjusting the adsorption energy of adsorbate species such as *OH H and *O. Generally, Ni-based (oxy) hydroxides demonstrate increased bonding strength to adsorbate species and enhanced OER activity. The electronegativity of neighboring atoms affects the OH adsorption energy at the catalytic site. Thus, an increase in electron population is known to decrease the repulsion of adsorbates and increase the bond strength. Therefore, NiFeAl, where the surface site of Ni (with a Mulliken electronegativity of 4.4 eV) coordinates with Al (3.2 eV) having lower electronegativity, exhibits stronger bonding to OH compared to NiFe.

Figure 10:
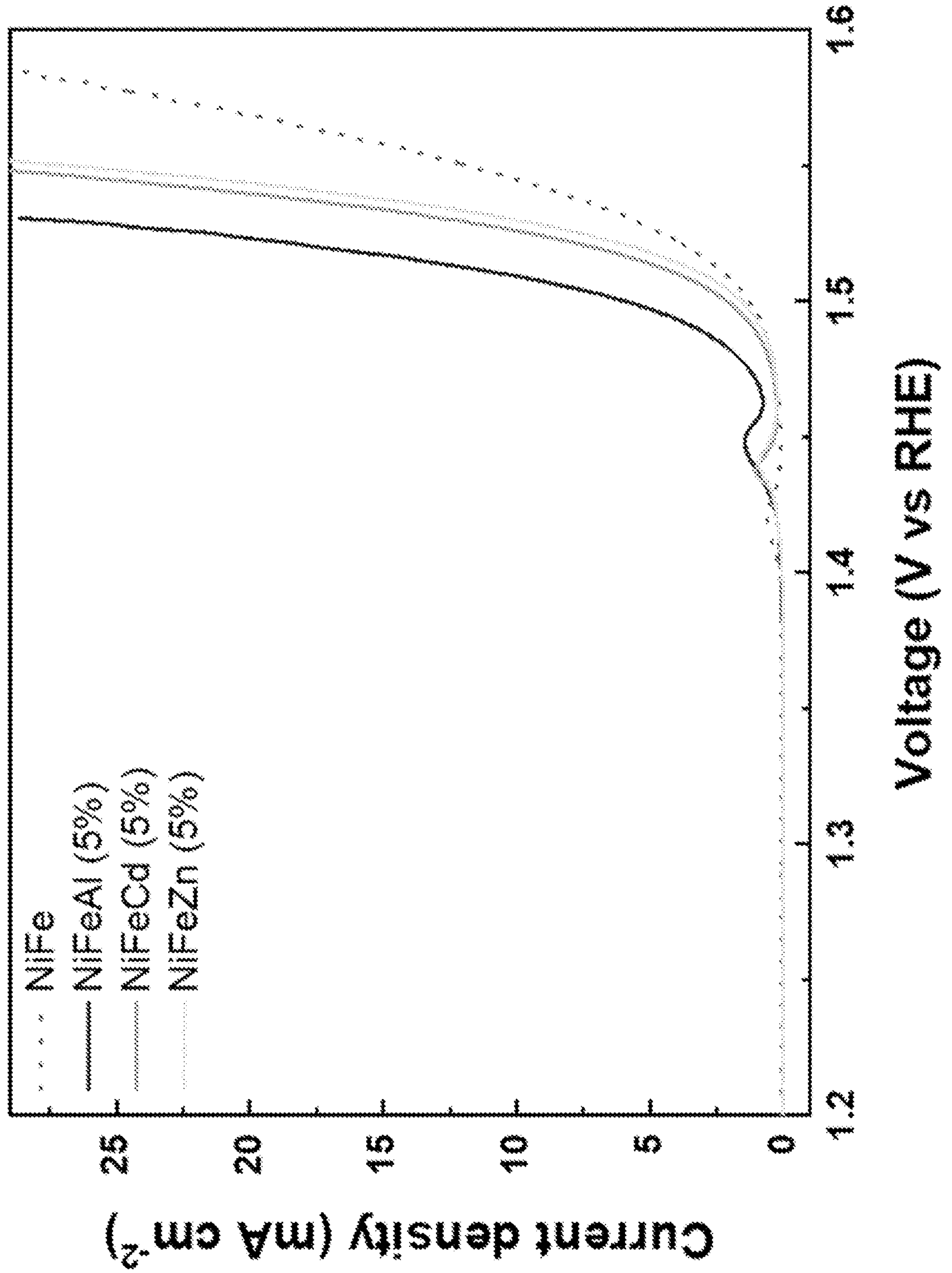
FIG. 10 is a current density-voltage graph representing the activity of a Ni—Fe-based catalyst for OER doped with a metal material possessing lower electronegativity than Ni and Fe, in accordance with an embodiment of the present invention.

The applicant of the present application conducted additional experiments by doping Cd and Zn, metals with low electronegativity, in NiFe-based (oxy) hydroxides to confirm the effect of low-electronegativity dopants. Doping these metals improves the OER activity, demonstrating a similar effect to doping with low-electronegativity metals. Specifically, referring to FIG. 10, when metals with lower electronegativity than Ni and Fe, such as Cd or Zn, were doped, for example, NiFeCd or NiFeZn exhibited superior catalytic performance compared to the existing NiFe catalyst. However, most preferably, the catalyst including NiFeAl showed the best performance.

Valence band measurements also provide direct information about the changes in the electron structure. As the d-band center approaches the Fermi level, the antibonding state shifts upward, reducing occupancy and increasing the *OH binding energy. FIG. 9D illustrates the atomic orbital band spectrum of NiFe and NiFeAl, from which the d-band center can be calculated. It is clearly observed that the calculated d-band center shifts closer to the Fermi level of NiFeAl, indicating a stronger *OH binding energy.

Meanwhile, the coexistence of electron-rich Ni species ($Ni^{2+}$) in Ni-based (oxy) hydroxides ($Ni^{3+}$) can enhance the binding energy of the adsorbate on the catalyst surface. The formation of electron-rich Ni-based (oxy) hydroxides can be confirmed by the appearance of a $Ni^{2+/3+}$ redox peak in the OER current-voltage curve. The $Ni(OH)_2$/NiOOH oxidation peak of electron-rich Ni-based (oxy) hydroxides shift in the positive direction because the electron-rich $Ni^{2+}$ species inhibits the oxidation of $Ni^{2+}$ to $Ni^{3+/4+}$. As shown in FIG. 5, the $Ni(OH)_2$/NiOOH oxidation peak of NiFeAl, which has a low Al concentration (≤10%), exhibits an anodic shift compared to NiFe. Therefore, these results confirm that an Al dopant enhances the OER activity by promoting the formation of electron-rich Ni species, which enhances the *OH binding energy in Ni-based (oxy) hydroxides.

In summary, charge transfer to Ni from dopants with electronegativity lower than that of Ni and Fe (e.g., Al, Cd, Zn) has at least three effects on NiFe doped with metals with lower electronegativity: 1) The increased electron density decreases the repulsive force of the adsorbate, 2) induces d-band upshift, and 3) promotes the formation of electron-rich Ni species. As a result, the OER activity is improved by increasing the bonding strength of the adsorbate *OH species.

Figure 11B:
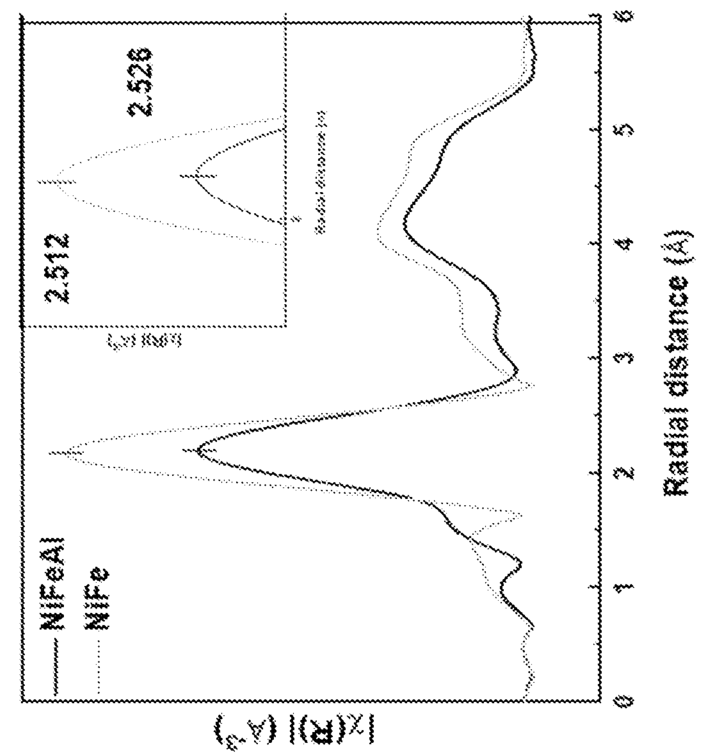
FIGS. 11A and 11B is a Raman spectrum graph intended to explain the lattice structures of NiFe and NiFeAl, as well as a graph depicting the EXAFS (Extended X-ray Absorption Fine Structure) measurement results for gauging the change in the d-band center, in accordance with an embodiment of the present invention.
Figure 11A:
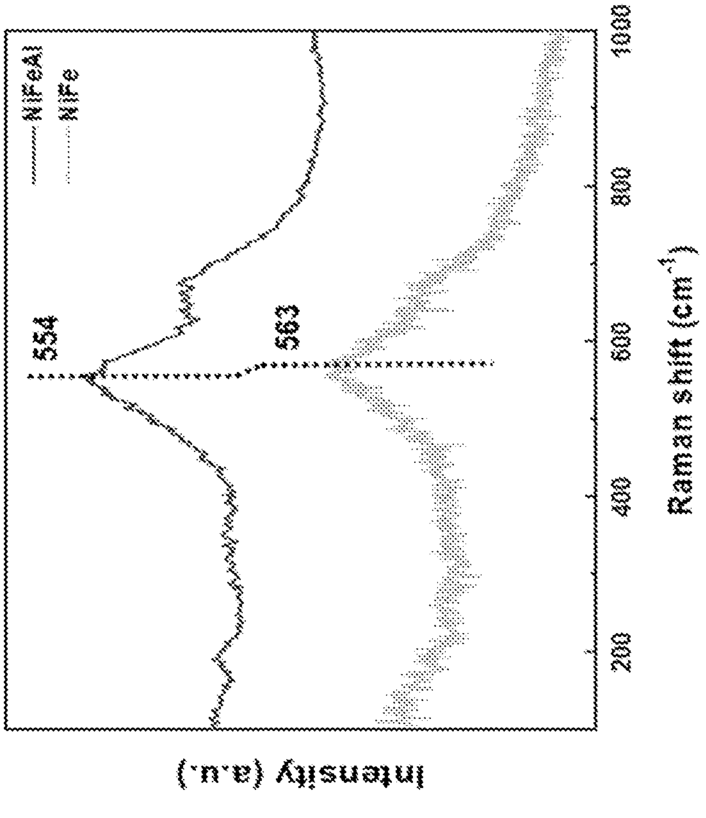

Meanwhile, FIGS. 11A and 11B is a Raman spectrum graph explaining that the lattice structure of NiFeAl was changed compared to NiFe by the addition of Al.

When a material is doped with a heteroatom, internal deformation occurs due to the coexistence of ions with different ionic radii. In this case, lattice strain, either tensile or compressive, modifies the electron structure of the catalyst by adjusting the bond distance and modifying the orbital overlap. In particular, lattice tension can shift the d-band center of transition metals, enhancing their bonding with adsorbates.

The Raman spectra of free-standing NiFe and NiFeAl layers after the OER, shown in FIG. 11A, were obtained at a wavenumber range of 100-1000 $cm^{-1}$ (see FIG. 11A). The signal at around 550 $cm^{-1}$ is attributed to the Ni—O bonding in the NiFe film. The Raman spectrum in FIG. 11A exhibited a redshift from 563 cm-1 to 554 $cm^{-1}$, induced by phonon softening due to lattice strain. This lattice strain is caused by the addition of Al, which has a smaller ionic radius (78 pm) compared to Ni (53.5 pm) and Fe (69 pm). These findings align with the upshift of the d-band center shown in FIG. 9D.

The change in the d-band center due to the tensile strain was further confirmed by conducting Extended X-ray Absorption Fine Structure (EXAFS) measurements (FIG. 11B). The XAFS spectrum was collected using both transmission and fluorescence modes. Since the sample was a catalyst layer grown on a Ni substrate, the analysis was performed at the Fe K edge instead of the Ni K edge to eliminate the influence of the substrate. The prominent peak near 2.2 Å corresponded to the Fe-M bond, and the radial distance of the Fe-M bond slightly shifted in the positive direction in NiFeAl (2.526 Å) compared to NiFe (2.512 Å). This observation explains the lattice tension exerted on the structure. Consequently, it can be inferred that the lattice disorder induced by the addition of Al enhanced the O-intermediate adsorption energy. As observed, the physical property evaluation experiments demonstrated that the Ni—Fe-based catalyst for OER, doped with metals such as Al, Cd, or Zn, having lower electronegativity than Ni and Fe, exhibited excellent activity and durability in the oxygen generation reaction. This contributes significantly to the cost reduction of hydrogen production by employing non-noble metal-based catalysts.

INDUSTRIAL APPLICABILITY

Therefore, the present invention provides a Ni—Fe-based catalyst for OER that exhibits excellent activity and durability compared to conventional Ni—Fe-based catalysts by doping aluminum into the non-noble metal-based catalyst, Ni—Fe.

Furthermore, the Ni—Fe-based catalyst for OER in the present invention holds economic value by not utilizing noble metals and can significantly contribute to reducing the cost of hydrogen production due to its superior activity compared to noble metal-based catalysts.

However, the effects of the present invention are not limited to the exemplary content described above, and the present specification includes various other effects.

Moreover, although the present invention has been described with specific examples and drawings, it is not limited to the described examples, and those skilled in the art would recognize various modifications and variations based on the general knowledge in the field to which the present invention pertains.

Therefore, the scope of the present invention should not be limited to the described examples but should be determined by the claims set forth herein, as well as their equivalents.

The invention claimed is:

1. A doped Ni—Fe-based catalyst for OER, comprising an alloy comprising Fe; Ni; and a metal selected from the group consisting of Al, Cd, and Zn, wherein the alloy comprises Ni and Fe at a molar ratio of 9:1 to 3:2, wherein the alloy comprises said metal at a molar ratio of 5 mol % to less than 10 mol % based on total moles of Ni, Fe, and said metal in the alloy, and wherein the alloy is obtained by thermally treating Ni, Fe, and said metal, or precursors thereof, in a reducing gas atmosphere comprising hydrogen at a temperature of from 1000° C. to 1500° C., inclusive, for a duration of from 50 seconds to 100 seconds, inclusive.

2. The doped Ni—Fe-based catalyst for OER according to claim 1, wherein the alloy comprises Ni and Fe at a molar ratio of 3:1.

3. The doped Ni—Fe-based catalyst for OER according to claim 2, wherein the alloy comprises said metal at a molar ratio of 5 mol % based on total moles of Ni, Fe, and said metal in the alloy.

4. The doped Ni—Fe-based catalyst for OER according to claim 1, wherein said metal is Al.

5. The doped Ni—Fe-based catalyst for OER according to claim 4, wherein the alloy is obtained by thermally treating Ni, Fe, and Al, or precursors thereof, in a reducing gas atmosphere comprising 5 vol % hydrogen and 95 vol % argon at a temperature of from 1200° C. to 1300° C., inclusive, for a duration of from 70 seconds to 80 seconds, inclusive.

6. The doped Ni—Fe-based catalyst for OER according to claim 4, wherein Al is incorporated as a heteroatom dopant into a crystalline lattice of the alloy, the alloy exhibiting a lattice strain induced by the incorporation of Al.

7. An alkaline water electrolysis system comprising end plates, current collectors, bipolar plates, porous transport layers, gaskets, an anode, a separator, and a cathode, wherein the anode comprises the doped Ni—Fe-based catalyst for OER according to claim 1.

8. The doped Ni—Fe-based catalyst for OER according to claim 1, wherein said metal is Cd.

* * * * *